Feb. 10, 1931.    G. SOMAJNI    1,791,848
CONTROL OF DIRECT CURRENT MOTORS
Filed May 1, 1928    2 Sheets-Sheet 2

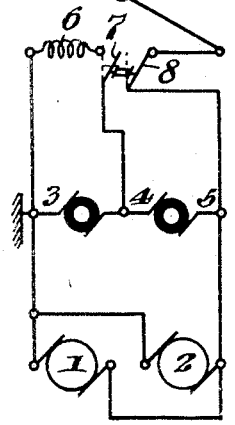
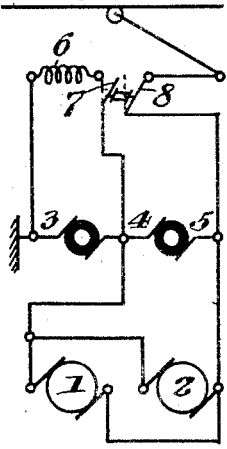
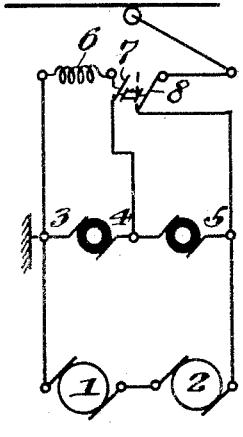
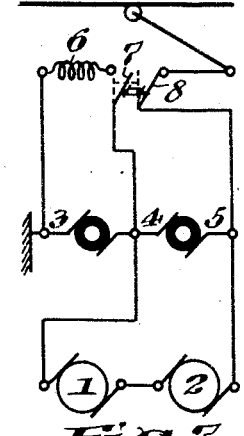
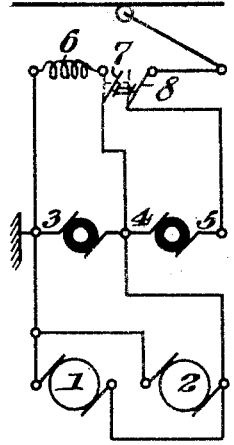
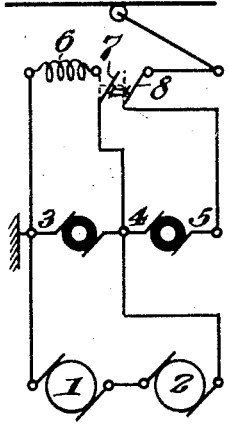
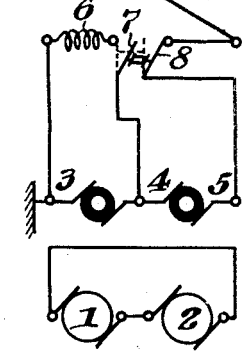
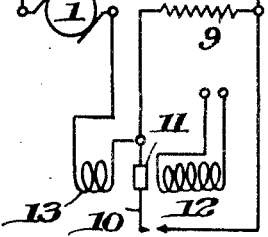
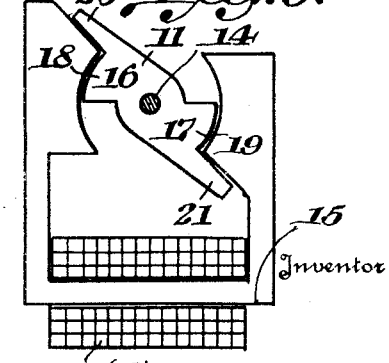

Inventor
Giacomo Somajni,
By Emil Rönnelycke
Attorney

Patented Feb. 10, 1931

1,791,848

UNITED STATES PATENT OFFICE

GIACOMO SOMAJNI, OF MILAN, ITALY

CONTROL OF DIRECT-CURRENT MOTORS

Application filed May 1, 1928, Serial No. 274,288, and in Italy May 7, 1927.

The present invention refers to a system of control for D. C. motors, based on the use of dynamotor groups arranged to provide various voltages, conveniently graded between zero and line voltage. The object of said invention is not only to avoid excessive peaks in the current diagram, but also all current breakage and reversal of the motors, which, occuring during the starting and braking operations, cause troublesome and dangerous reactions and jerks.

Another object of the invention is to secure the aforesaid safe performance without losing the advantage of reversibility in operation, by virtue of which, in stepping through the same positions by which the motors are started, but in the opposite direction, a slowing down or braking action is obtained.

According to the present invention the above objects are effected by means of auxiliary resistances, connected at one end with a binding post of each motor, and at the other end with a contactor arranged and operated in such a manner as to obtain for an instant the closure of one of the succeeding circuits between which the switching is done, during the time in which both circuits would otherwise be interrupted on account of said switching.

This can be done in the simplest and most convenient manner by means of contactors capable of closing the succeeding circuit for an instant just before the preceding circuit breaks during the starting operation, and consequently maintaining the preceding circuit closed for an instant during the first moment in which the succeeding circuit is closed during the opposed braking operation.

In all cases additional resistances can be utilized, capable of damping any occurring current jerks.

The accompanying drawings show, merely as an example, one embodiment of the invention:

Figures 1 to 6 thereof are diagrams showing possible ways of connecting two motors, which are themselves connected together either in series or in parallel, with different terminals of the dynamotor group.

Fig. 7 is a diagram showing the motors disconnected from the dynamotor group.

Fig. 8 represents the same diagram provided with an arrangement for automatic control.

Fig. 9 shows a device suitable for effecting the control indicated in Fig. 8.

Figure 10:
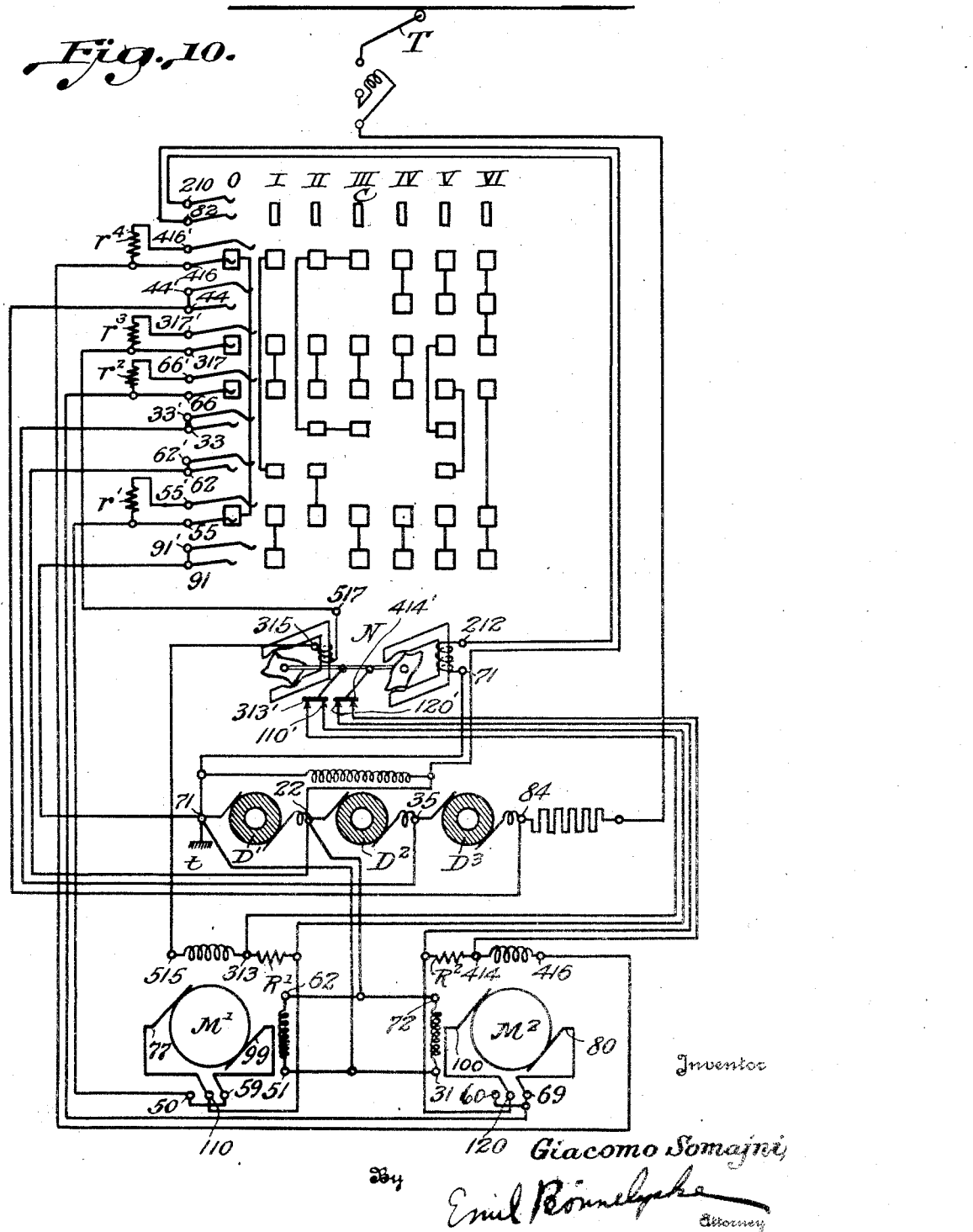
Fig. 10 is a general diagram of a reversing control arrangement for two D. C. motors with a three-winding dynamotor, having auxiliary resistances for damping current jerks.

In the arrangements shown, there are two compound driving motors 1, 2 adapted to be connected in series or in parallel between different terminals of a dynamotor group comprising two machines. The machines are connected between terminals 3, 4, 4, 5, respectively, and are such that one-quarter of the line voltage, i. e., the voltage between terminals 3 and 5, is normally between terminals 3 and 4, and the remaining three-quarters between terminals 4 and 5. An electro-magnetic braking arrangement, which may be of any known kind and which is represented diagrammatically by a winding 6, is connected through a switch 7 across the terminals 3 and 4. The switch 7 may be controlled by hand or by means of a relay operating directly, or it may be controlled automatically. In the examples shown, it is merely connected to the main switch 8 so as to open when the latter is closed and vice versa. The motors 1, 2 can be connected together and to the dynamotor group in any of the six ways shown in Figs. 1 to 6, or they can be disconnected therefrom, as shown in Fig. 7.

The various connections shown in Figs. 1 to 7 may be effected by means of a controller of any known type which may be the starting controller ordinarily provided for the motors 1 and 2.

Referring to Fig. 1, the motors 1 and 2 are shown connected in parallel across line and ground, the main switch 8 being in the right-hand position and, therefore, closed to line. To actuate the brake, the switch 8 is moved to the position shown in dotted lines, the switch 7 being thus closed.

Assuming the vehicle to be in motion, voltage is applied to the brake device 6 from the terminals 3, 4; braking is thereby effected and the vehicle and, hence, the motors 1, 2 slow down.

While the connections remain as shown in Fig. 1, the retardation results in a diminution of the currents throughout the circuit and, consequently, in a diminution of the current applied to the braking device 6 until braking is terminated. At or before this point is reached, the circuit is changed from that of Fig. 1 to that of Fig. 2 in which the motors 1, 2 are still in parallel but are now connected between the terminals 4 and 5.

The E. M. F. due to the motors 1, 2 is now applied wholly between terminals 4 and 5 and, in consequence, the machine between these terminals operates at an increased speed, the dynamotor group speeds up, there is an increase of the E. M. F. between terminals 3 and 4 and the braking action increases. When a certain degree of retardation is reached, the connections are changed to those shown in Fig. 3, the motors 1, 2 are connected in series across terminals 3, 5 and the dynamotor group again speeded up.

As retardation proceeds, the connections are successively changed, passing, in turn, through the circuits shown in Figs. 4, 5 and 6; there being a temporary increase of the speed of the dynamotor group and a consequent increase in braking over that immediately preceding the change at each change, so that when in the last step, the circuit is changed to that of Fig. 7, with the motors 1, 2 completely disconnected, the residual kinetic energy of the dynamotor group is sufficient to generate the power required to stop and hold the vehicle even if it is on a slope.

Obviously it is not necessary to pass through all the braking positions shown in Figs. 1 to 6 and braking can be commenced in any of these positions.

It will be seen that each time a circuit change is effected, the sharp increase of current generated by the motors is fed to the braking device 6 and also transformed into an increase of the driving power of the dynamotor group which thus, owing to its effective inertia, opposes a damping action against rapid oscillations or violent changes of braking force. Nevertheless, with very rapid changing of connections excessive oscillations can occur, and to prevent this the auxiliary arrangement described in connection with Figs. 8 and 9 is preferably provided.

Referring to Fig. 8, there is connected in series with each motor 1 or 2 an additional resistance 9 adapted to be short-circuited under the control of a differentially-wound relay whose double armature 11 operates a switch 10; the construction of this relay being illustrated in Fig. 9. The armature 11 is influenced in opposite directions by a voltage winding 12 and by a current winding 13, which latter is traversed by the armature current of its associated motor. The relay is adjusted so that the additional resistance 9 is inserted whenever the armature current exceeds a predetermined limit.

In the construction of relay shown in Fig. 9, the double armature 11 is mounted on a rotatable shaft 14 by which the switch member is carried. The windings 12 and 13 are arranged differentially on a common core 15 having pole pieces 18 and 19, and the armature is formed with cylindrical flanks 16, 17 shaped to the pole pieces and producing a small air gap. The arc embraced by the said cylindrical flanks should be nearly equal to the permissible rotation of the armature and should be such as to leave a considerable portion of the pole pieces uncovered when the armature is in its full-open position. Formed upon the said armature are two wings 20, 21 arranged to produce in co-operation with the pole pieces a variable air gap. The action due to the cylindrical flanks is very considerable, and is constant during the whole movement of the armature if the dimensions are such as to avoid saturation of the iron in every position; but the action due to the wings increases rapidly as the armature approaches its closed position, so that the desired differential action is intensified and stability of movement assured. Satisfactory control or bias can be provided by gravity or by springs tending to hold the armature normally in open position.

In operation, when the circuit of the voltage winding 12 is interrupted, the relay is opened by the action of the springs or other bias means assisted by the current winding. The method of operation will be obvious: in each of the six positions shown in Figs. 1 to 6, the voltage winding will be traversed by current, but during the passage from one position to another said current is interrupted. The relay is thus opened by the bias means and the current winding; but when the new connection is made, the voltage winding is again energized and the relay will only be closed when the action of the voltage winding overcomes that of the current winding 13; that is, when the motor current has sufficiently diminished.

It will be apparent that the starting controller may be arranged to effect starting or braking according as to whether the main switch 8 is closed or open and the switch 7 correspondingly open or closed.

This arrangement gives great certainty of operation, since the operator has only to accomplish his usual operations to stop the train ordinarily, because when the main switch 8 is opened (an operation which can be effected automatically in various ways) the brakes will be applied. Moreover, the said arrangement can be employed to effect braking after the vehicle has been slowed down gradually without brakes. It is merely necessary to arrange in the controller suitable contacts connected respectively to the braking circuit and the dynamotor group. These contacts may be arranged to be closed when the circuit is changed from that shown in Fig. 6 to that shown in Fig. 7. According to this last arrangement, the switch 7 is held open while the switch 8 is closed and the motor disconnected. The closing of the braking circuit 6 on the dynamotor group produces a braking action while the switch 7 remains open.

In the diagram shown in Fig. 10, all members and apparatus which have no direct relationship with this special arrangement are omitted in order to obtain the greatest possible clearness.

In the present case the two motors $M_1$—$M_2$ are controlled through controller C connected with the three-winding dynamotor $D_1$—$D_2$—$D_3$, whose voltages are supposed to be in the ratio of $1:2:1$, said dynamotor being inserted between trolley T and the earth $t$.

Two pairs of auxiliary resistances $r_1$—$r_3$ and $r_2$—$r_4$ (which can be either inductive or non-inductive are conveniently connected to controller C and to motors $M_1$—$M_2$, and two additional resistances $R_1$—$R_2$ can be short-circuited by a differential relay N provided with series- and shunt-excited electro-magnets, acting one against the other.

The auxiliary resistances $r_1$, $r_2$, $r_3$, $r_4$ are provided to prevent any breakage or reversal of current during the passage from one connection to the succeeding one. The additional resistances $R_1$—$R_2$, which can be short-circuited by differential relay N, can be inserted to damp the current peaks when each connection is established as will be shown hereafter.

The advantages of such an arrangement of circuits will be clear from the following:

It is well known that the only system permitting the complete regeneration of energy in the simplest, most natural and economical manner (both during down-grades as in slowing down or stopping), is the one based on the use of compound motors associated with a dynamotor which, by splitting the line voltage in different parts, provides for the armature of the motors a grading of voltages increasing from zero to full line voltage. The starting operation is reduced to that of impressing on the motor armatures the above increasing voltages.

The same operation in the opposite direction impresses on the same motors a graded decreasing voltage, which causes a natural braking with consequent complete regeneration of the kinetic energy of the cars.

The different positions of control are thus arranged in proper sequence both for starting and for braking; this feature can be called: "reversibility of operation."

Said reversibility can be maintained, when it may be required to insert low resistance rheostats in passing from a one dynamotive voltage to the next, so as to reduce the current peaks in the motors. It is, however, necessary in such a case that the periodical insertion and exclusion of rheostats, instead of being made directly by the controller, be made by an automatic device which short-circuits the resistances only when the current in the motors has dropped below a certain limit value.

The sole current regulation in the motors obtained by automatic devices short-circuiting the additional resistances, does not prevent entirely the troublesome jerks that are so detrimental to the maintenance of the equipment. These jerks are caused by sudden current cut-outs in the motor armatures on passing from one feed voltage to the next, both during the starting as well as during the braking operations, and this can even cause the pinion of the motor to get out of mesh with the corresponding gear wheel.

Such breakages of current, which happen considerably more often in the above arrangement than in ordinary series-parallel control systems, also retard both the speeding-up and the speeding-down of the vehicle. The essential parts of the present arrangement cause the current in the motors to be maintained even during the passage from one connection to the other. During such passage the current can decrease, but never breaks or reverses the direction it had before the switching operation.

It follows that both the starting torque and the braking torque are not liable to be interrupted, which fact enables avoidance of the jerks caused by such interruptions. Notwithstanding this, the controlling device maintains its feature of complete reversibility, as there are still only so many positions of control as there are voltages at disposal for feeding the armatures of the motors.

All this is obtained in a very simple way by arranging at both terminals 55—317 and 66—416 (see Fig. 10) of each armature circuit the two pairs of auxiliary resistances $r_1$—$r_3$ and $r_2$—$r_4$.

The free ends 55'—317' and 66'—416' of said resistances are connected to the corresponding brushes 55'—317' and 66'—416', sliding on contacts 55—317 and 66—416, but shifted in relation to the same through an angle practically equal to half the angular distance, or step, between the center-lines of two succeeding contacts. It follows that the armature circuits of the motors are never broken, because when the main brushes 55—317 and 66—416 are not in contact, the auxiliary ones 55'—317' and 66'—416' are in contact, so that a reduced current can traverse the armatures of the motors through resistances $r_1$—$r_3$ and $r_2$—$r_4$.

In order to secure current continuity in the motors, it is sufficient that the fixed contacts be spaced apart an angular distance somewhat greater than the space required by the interruptions.

Thus, during an instant, the main brushes and the auxiliary ones make contact simultaneously, the former on a given fixed contact and the latter on the fixed contact next to it: the resistances $r_1$—$r_3$ and $r_2$—$r_4$ are traversed by transient parasite currents, because their ends are in contact with dynamotoric terminals of different voltage, but the Joule effect of the same is quite inappreciable owing to its very short duration. The immediate interruption of said currents is very easy, being made on the same fixed contacts on which the main current is interrupted.

In the kind of field excitation chosen, the shunt excitation, both in the dynamotor and in the motors, is branched between terminals 71—72, namely on ¼ the feed line voltage V: the same may be said for the voltmeter coil 71—212 in the automatic device N short-circuiting the additional resistances $R_1$—$R_2$.

In such a case the two armature circuits of the motors are as follows:

$55'$—$r_1$—$\begin{cases}59—99\text{—armature }M_1—77—110\\50—77\text{—armature }M_1—99—110\end{cases}$—$R_1$—313—series excitation—315—series coil of short-circuiter—517—317—$r_3$—317'—

$66'$—$r_2$—$68\begin{cases}69—80\text{ armature }M_2—100\\60—100\text{ armature }M_2—80\end{cases}$120—$R_2$—414—series excitation—416—$r_4$—416'.

The controller cylinder C comprises: the four double brushes 55—55', 317—317', 66—66', 416—416' forming the terminals of said armature circuits; the brushes 91'—62'—33'—44' of the dynamotor terminals; and the small brushes 82—210, collecting current for the voltmetric or shunt coil of the short-circuiting device only when the cylinder is stopped in positions I—II—III—IV—V—VI.

There are seven control positions, six of which are for running, and they are characterized as follows:

Position I: Two motors in series, fed between 91 and 62, each armature supporting a voltage 1/8 V.

Position II: Two motors in series, fed between 62 and 33, each armature supporting a voltage 2/8 V.

Position III: Two motors in series, fed between 91 and 33, each armature supporting a voltage 3/8 V.

Position IV: Two motors in series, fed between 91 and 44, each armature supporting a voltage 4/8 V.

Position V: Motor $M_1$ is inserted between 91 and 33, and motor $M_2$ between 62 and 44, each armature supporting a voltage 6/8 V.

Position VI: Two motors in parallel, branched on the full line voltage, each armature supporting the full line voltage V.

As the controller cylinder reaches definitely any of such operating positions, the voltmetric electromagnet 71—212 is excited as soon as 82 touches 210. Contacts 110'—313', 120'—414', which short-circuit resistances $R_1$ and $R_2$, having been broken by the interruption of the voltmeter coil at 210—82 during switching, have a tendency to close again immediately, but this is only possible when the antagonistic action of the shunt-wound electromagnet is sufficiently reduced.

This operation is obtained whatever be the direction of the main current, namely both during speeding-up and during slowing-down (braking). The same adjustment holds good for both cases, the two electromagnets being absolutely independent.

What I claim is:

1. Electro-dynamic braking apparatus for use in electric vehicles and comprising a plurality of mechanically coupled electrical machines forming a dynamotor group; a braking device energized from voltage generated across part of said dynamotor group; and means for changing the connections between the machine in said group and the motor of the vehicle and thereby controlling the braking.

2. Braking apparatus according to claim 1, in which automatic means are provided for switching a resistance or resistances into the motor circuit, whereby rapid surges of brake current are reduced or prevented.

3. Braking apparatus according to claim 1, in which automatic means are provided for switching a resistance or resistances into the motor circuit, whereby rapid surges of brake current are reduced or prevented; said automatic switching means comprising a differentially-wound relay having voltage windings and current windings, the latter winding being energized by the motor current and being so proportioned as to actuate the relay to establish a short-circuit across the resistance or resistances when said motor current decreases below a predetermined limit.

4. Braking apparatus according to claim 1, in which automatic means are provided for switching a resistance or resistances into the motor circuit, whereby rapid surges of brake current are reduced or prevented; said automatic switching means comprising a differentially-wound relay having voltage windings and current windings, the latter winding being energized by the motor current and being so proportioned as to actuate the relay to establish a short-circuit across the resistance or resistances when said motor current decreases below a predetermined limit; said relay comprising an armature formed with cylindrical flanks which, in all positions, are parallel to and separated a small distance from pole-pieces upon the core of the relay, and also formed with wings co-operating with the sides of said pole-pieces to form variable air gaps which are closed in the attracted position of the armature.

In testimony whereof I affix my signature.

GIACOMO SOMAJNI.